March 31, 1964    R. A. BURGY    3,126,982
DISPATCHING CONTROL FOR A GROUP OF ELEVATORS
Original Filed Aug. 10, 1959    7 Sheets-Sheet 2
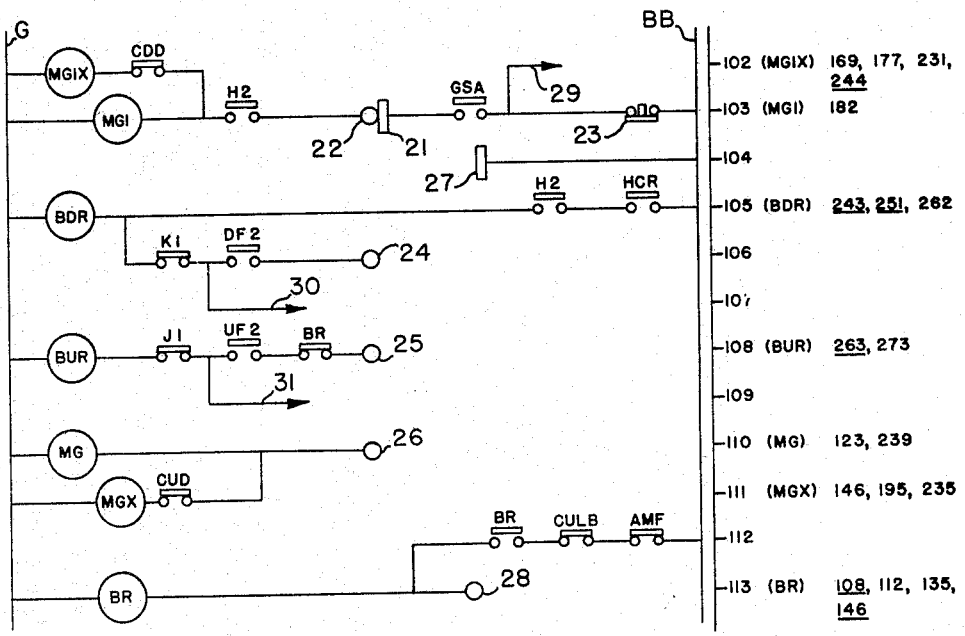
Fig-II
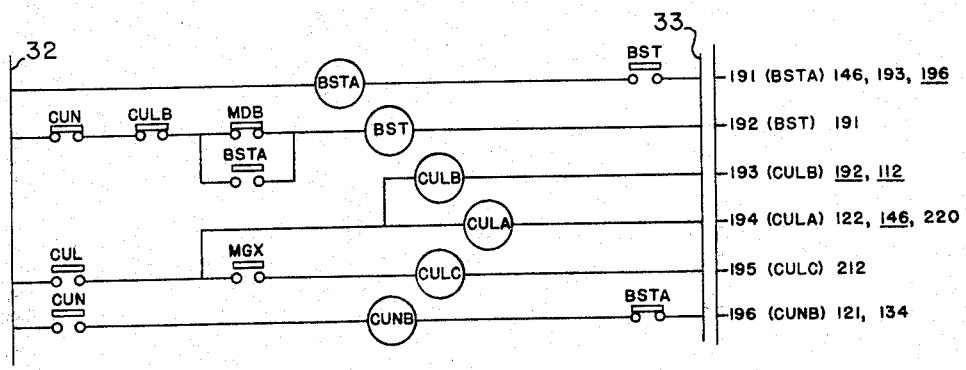
Fig-V
INVENTOR.
RAYMOND A. BURGY
BY
Marshall, Wilson & Click
ATTORNEYS

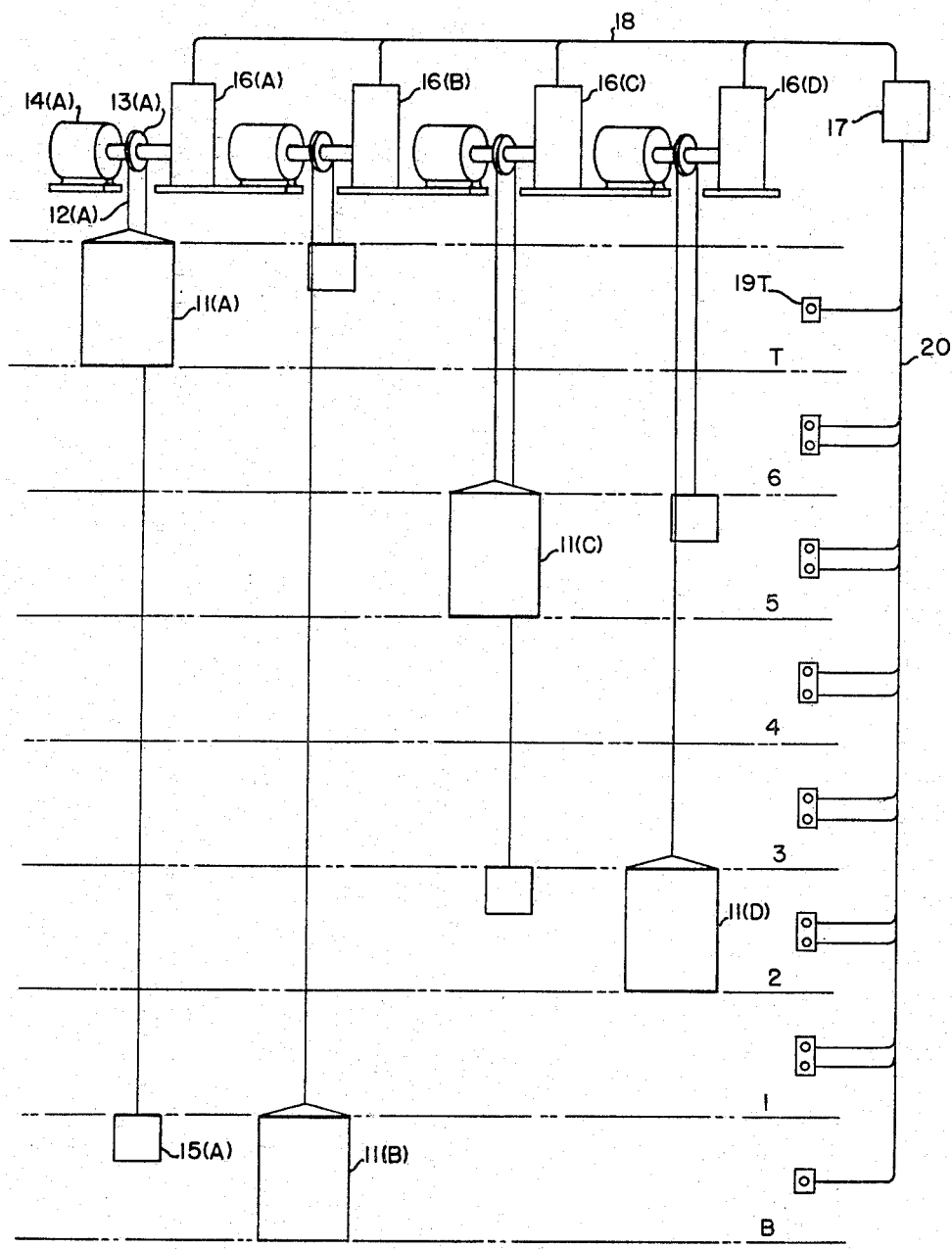
Fig. I

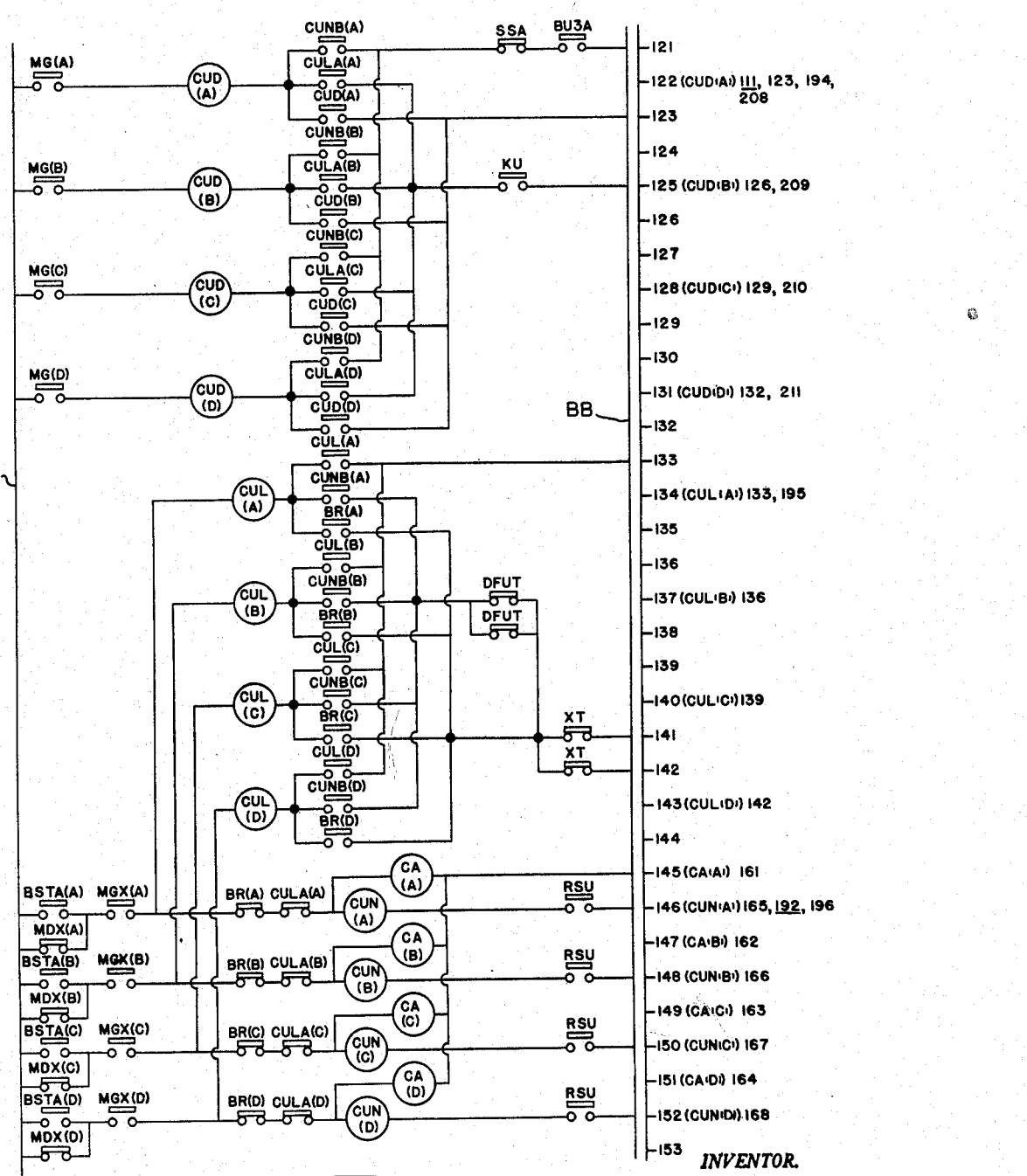
Fig. III

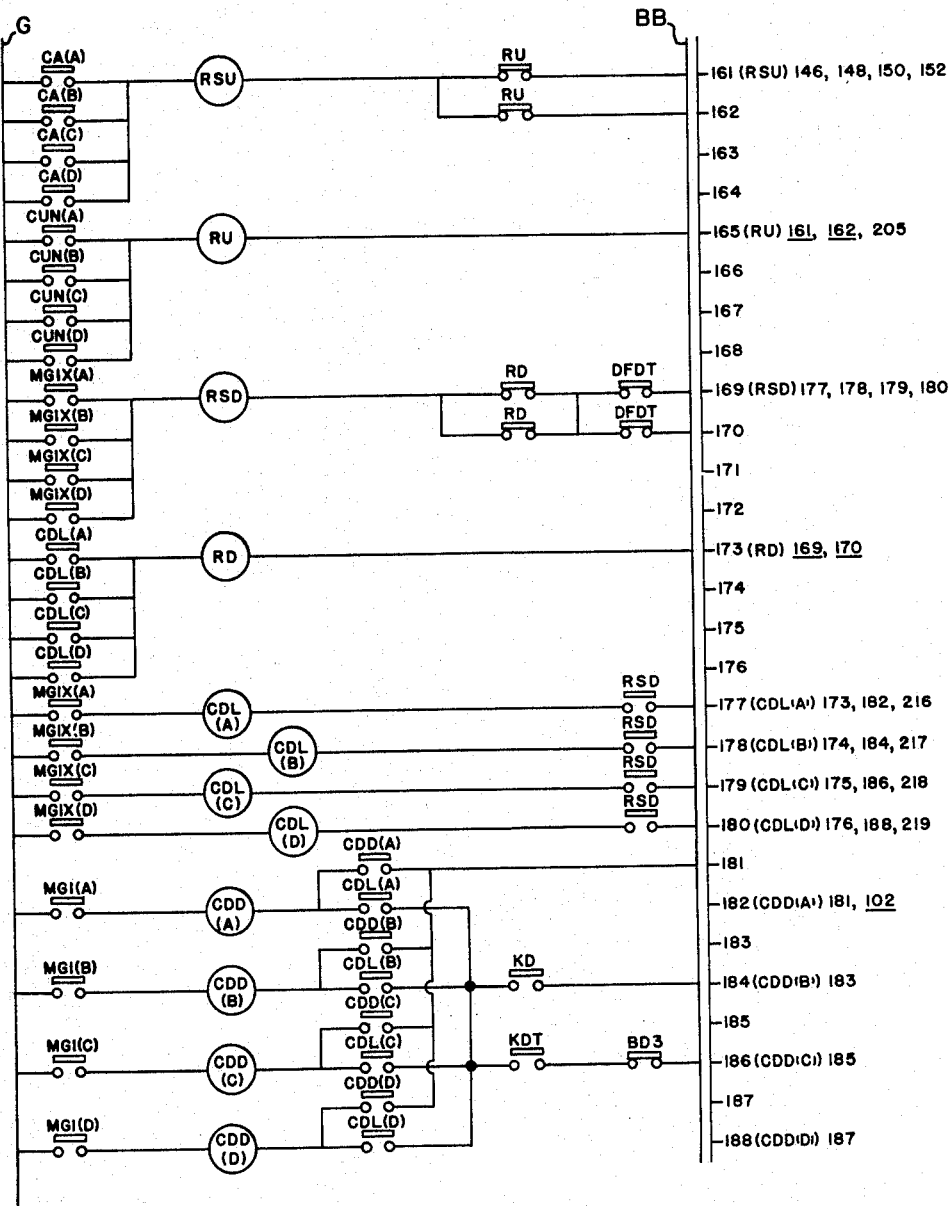
Fig-IV

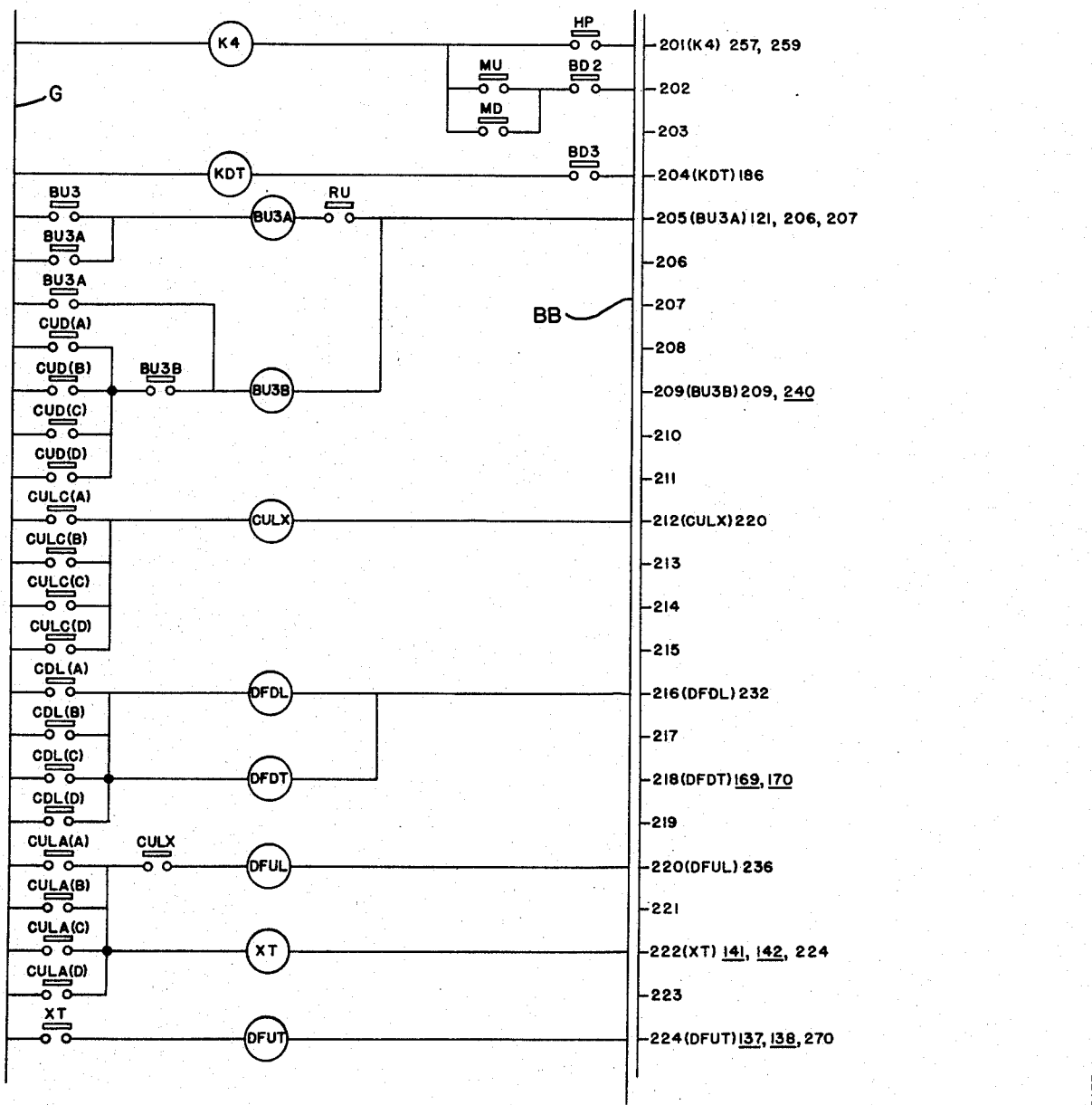
Fig. VI

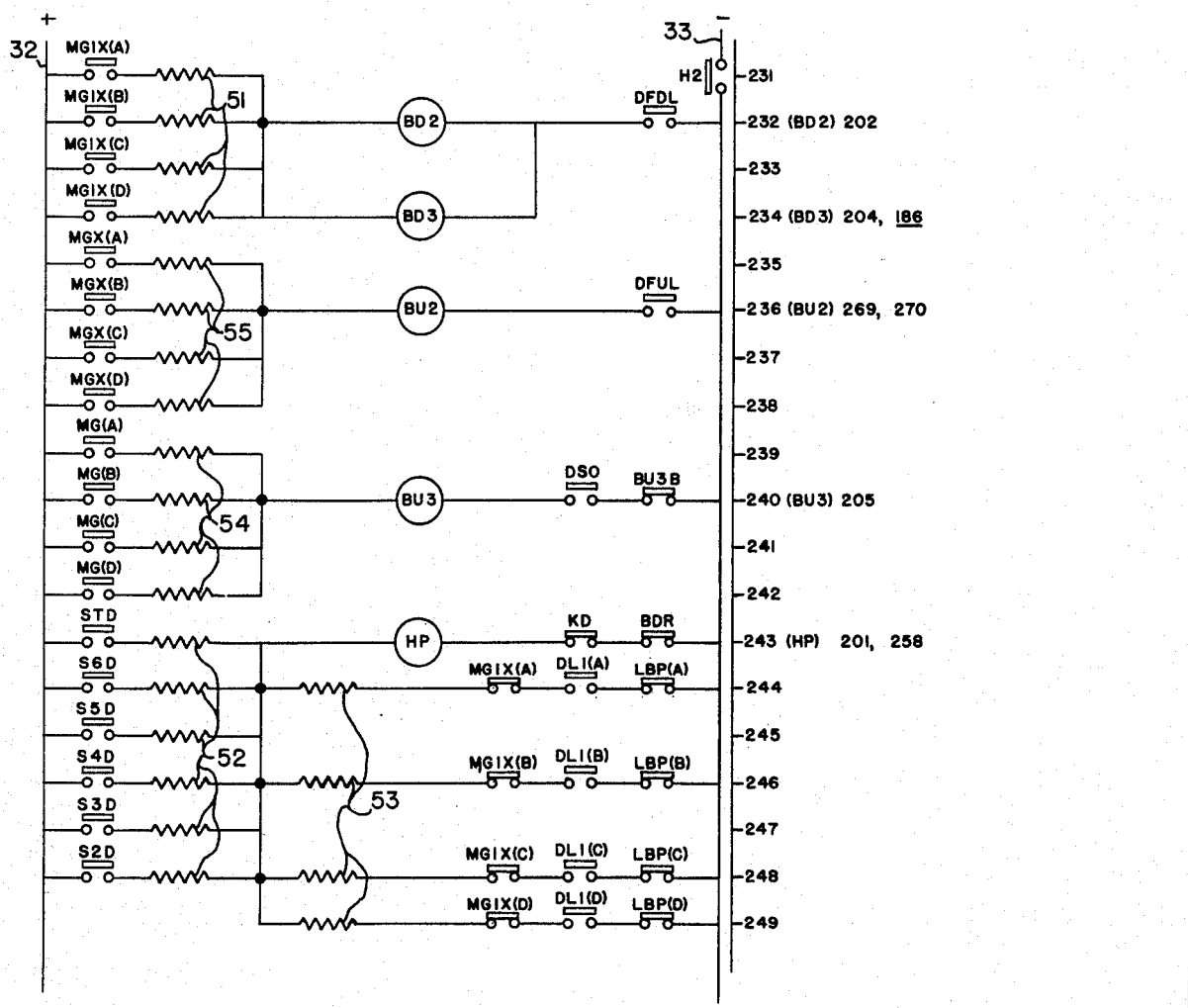
Fig. VII

March 31, 1964 R. A. BURGY 3,126,982
DISPATCHING CONTROL FOR A GROUP OF ELEVATORS
Original Filed Aug. 10, 1959 7 Sheets-Sheet 7
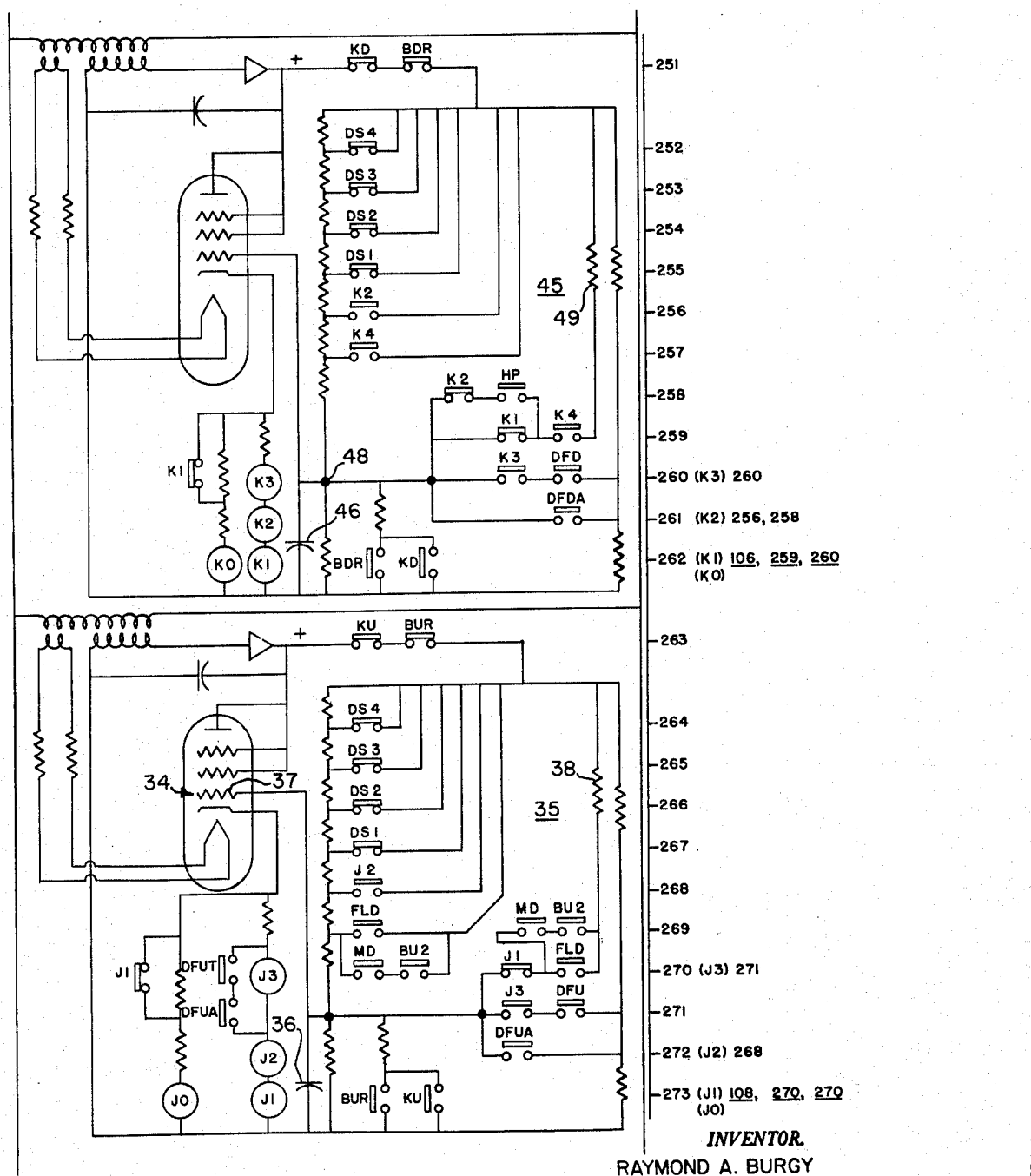
Fig. VIII
INVENTOR.
RAYMOND A. BURGY
BY
Marshall, Wilson & Chick
ATTORNEYS

United States Patent Office 3,126,982
Patented Mar. 31, 1964

3,126,982
DISPATCHING CONTROL FOR A GROUP OF
ELEVATORS
Raymond A. Burgy, Maumee, Ohio, assignor to Toledo
Scale Corporation, Toledo, Ohio, a corporation of Ohio
Original application Aug. 10, 1959, Ser. No. 832,772, now
Patent No. 3,009,543, dated Nov. 21, 1961. Divided
and this application Sept. 21, 1961, Ser. No. 141,564
20 Claims. (Cl. 187—29)

This application is a division of application Serial No. 832,772 filed August 10, 1959 and issued November 21, 1961 as Patent No. 3,009,543.

This invention concerns controls for distributing elevator cars operating as a group and has as its principal object the enhancement of the distribution of cars in a bank to best meet the needs of the elevator traffic with those cars.

An additional object of the invention is to enhance elevator service by a group of cars.

Another object is to avoid unwarranted retardation of elevator cars, particularly in a system wherein the cars are retarded in traveling away from certain floors in order to maintain them spaced apart in the system.

A further object is to retard cars under certain conditions at particular floors where car presence is most desirable.

A fifth object is to increase the utilization of cars which have served a floor beyond a dispatching floor in the group of cars.

Heretofore, the distribution of elevator cars operating as a group has been controlled by dispatch mechanisms which issue starting signals to cars from dispatching floors at which they are held pending their reception of such starting signals. Often the dispatch signals are issued on a time basis. It has been observed that occasionally cars are tardy in arriving at the dispatching floor and arrive in bunches. Early in the evolution of dispatched elevator systems, it was observed that improved service could be obtained under circumstances where cars accumulated at a dispatching floor by decreasing the dispatch interval between the issuance of the starting signals to cars at the floor. This mode of operation enabled the accumulated cars in succession to be assigned to a loading status, receive at least a portion of any load available for travel away from the dispatching floor and be started away from the floor in the same order they entered the dispatching sequence. Thus, each car in turn was required while traveling away from the dispatching terminal to stop for the several car calls registered by the passengers received at the terminal and each car was held back on the average the same amount of time by virtue of these stops in response to registered calls in the car. The group of cars, therefore, remain spaced in a closer relationship than was desirable since ordinarily the normal dispatching interval was arranged as the average round trip time divided by the number of cars in service and the acceleration of this interval created a period in which, under normal operations, no car was available for dispatching after the bunched group had been started.

The failure of cars to arrive at a dispatching terminal at regular intervals due to the delays imposed by the demands for their service have been met in a number of ways. One technique has been to reverse a car traveling away from a dispatching terminal at its farthest call spaced from its dispatching terminal. This technique has been supplemented by timing mechanisms which enable the late return of the car to its dispatching terminal to be anticipated. One mode of operation embodying this theory permitted the car to travel to and run from an opposite terminal from which it was time dispatched unless it was evident that the car would be late in returning to the initial dispatching terminal, in which event that car was reversed at its farthest call. Anticipation of the tardiness of cars and the conditioning of those cars for reversal short of the second dispatching floor ordinarily was sensed by a timing mechanism and associated means which took into consideration the presence or absence of a car available for dispatching toward the main dispatching terminal and which operated on a relatively uniform interval. Where no car was available to be dispatched toward the main dispatching terminal and where calls were registered ahead of the farthest car from that terminal, reversing systems of this nature fell down in their objective of expediting uniformity of car distribution.

Efforts to uniformly distribute cars by dispatching them at regular intervals enjoyed only limited success due to the retarding effect of hall calls since the registration of a large number of calls ahead of a dispatched car so retarded it that the following cars soon overtook it and then remained bunched, leap frogging each other along the path of travel. Accordingly, controls were introduced which altered the dispatch interval according to the number of hall calls registered. Such controls often over compensated this condition by starting a greater number of cars than was reasonable in rapid succession thereby, in extreme instances, bunching all cars to serve the surge in demand.

A further aspect of timed dispatchers for groups of elevator cars which presented undesirable delays in service involved the interlocking of the elevator cars such that following cars at the dispatching terminal could not receive a dispatch signal until the previously dispatched car had departed from the terminal. This problem was met by devices which sense the failure of a first car to depart and remove that car from the group operation when the dispatching sequence has been delayed for a given period by virtue of a start failure. A dispatcher which overcame this inherent defect of prior timed dispatchers is disclosed in co-pending United States patent application Serial No. 808,290 filed March 30, 1959 for "Elevator Controls" in the name of R. A. Burgy illustrating a timer which was reset upon the issuance of a dispatch signal and issued a second dispatch signal to a second car a dispatch interval thereafter, or in the alternative, upon the starting of the first car away from the dispatching floor was again reset and issued a dispatch signal to a second car a dispatching interval after the departure of the first car from the dispatching floor. Upon occasion, it has been observed that a dispatched car will be delayed in starting from the dispatching floor for a substantial period. Such delays may be occasioned by an inconsiderate passenger holding the door in an automatically controlled elevator or by certain unusual conditions which may arise dictating to an attendant that the starting operation be delayed in an attendant controlled elevator. Thus, it might arbitrarily be said that once a dispatched car had been delayed for one-half of the dispatching interval or longer, it would be undesirable upon the starting of that car prior to the termination of that dispatching interval to reset the dispatching interval. An undesired delay would be imposed by the second resetting operation of the dispatch timer as the next car to be dispatched would then be required to stand at the dispatching floor conditioned for loading for an interval equal to one dispatching interval plus the full delay of the preceding car. Under such conditions, passengers may become restless, and quite dissatisfied with the elevator service.

The present invention overcomes the shortcomings of the prior art schemes for improving the uniformity of distribution and service afforded by elevators operating in groups by limiting the extension of a dispatching period which can be effected by the departure of a car from a dispatching floor to an initial portion of the dispatching period following a dispatch timer reset. This limitation of the period a departing car reset is effective is combined with supplemental operations occurring at the dispatching floor to further enhance system operation. When no car is conditioned at a dispatching floor to receive a load for travel in the primary dispatching direction, the arrival of a car from the opposite direction or floor beyond the dispatching floor, heretofore treated as unavailable for dispatching, actuates controls to introduce that car into the dispatching sequence thereby insuring timely availability of a car for loading. Conversely, a car from the floor beyond when not introduced into the dispatching sequence is permitted to travel past the dispatching floor at any time without causing reset of the dispatch timer. The presence at the dispatching floor of a car in addition to that car conditioned to receive a load to be transported in the primary dispatching direction can impair service and increase bunching. That bunching is avoided by issuing a start signal to that car which is not conditioned for loading independent of the dispatching operation of the car conditioned for loading since that car is not retarded by car calls and therefore has an opportunity to advance substantially ahead of the load car. This effect is enhanced by reset of the dispatch interval for the load car when the unconditioned car is started during the initial portion of the dispatch interval. During the latter portion of that interval the departing car reset is rendered ineffective since a reset at that time would impose an excessive delay on the load car.

The invention contemplates another method of making cars available at regular intervals at the dispatching floor without bunching those cars at that floor wherein cars are returned to the floor expeditiously. A second dispatching floor is employed in conjunction with a second dispatch timer arranged to issue start signals to the cars at the second dispatching floor or to reverse an approaching car at its closest call to that floor if no car is available for dispatching at a given instant indicating that a car is late. The intervals of this second dispatch timer are shortened in response to certain relationships of hall calls for service toward the other dispatching floor and the number of cars available to serve those hall calls. For example, the system can be arranged to expedite the issuance of a signal starting the car toward the main dispatching floor in response to the registration of two hall calls if no other car is conditioned to serve those calls; however, if a car is so conditioned three additional calls or a total of five would be required to abbreviate the dispatch interval for a second car. This technique lends itself to expansion and adjustment depending upon the number of floors served and the number of cars in the group.

Car count dispatch time acceleration is integrated with certain aspects of this system so that car departure dispatch timer reset is rendered ineffective when cars accumulate at a dispatching floor. This is accomplished by speeding up the initial operation of the dispatch timer to cause it to operate a departure reset disabling circuit before a time dispatched car has an opportunity to respond to its dispatch signal and reset the timer.

In accordance with the above, one feature of this invention involves means sensing the accumulation of elevator cars at a dispatching terminal and, responsive to that accumulation, accelerating the dispatch of a car having the least load, whereby that car spaces itself substantially ahead of those cars conditioned so that they normally would contain a greater load. One particular technique for achieving this spacing is to issue a starting signal to a car at a dispatching floor prior to or early in the interval it was conditioned to receive a load whereby only a few, or, more advantageously, no passengers are received by that car. Upon being dispatched, that lightly loaded car is delayed in its travel toward its opposite terminal in response to only a few calls registered within the car or the hall calls it may encounter in traveling toward that opposite terminal, or where no passengers are received, only by the hall calls it encounters.

A second feature of the invention resides in improving the dispatch timer of the aforementioned co-pending United States application. By incorporating in that dispatch timer means limiting the interval during which the departure of a previously dispatched car will reset the dispatch interval of a car to be dispatched subsequently. This interval limiting means can advantageously be incorporated in the existing form of that dispatcher such that the timer measures its own limiting interval. For example, upon the expiration of one-half of any normal dispatching interval, the timer renders ineffective its reset circuit which is responsive to the departure of a previously dispatched car so that that car can be started anytime thereafter without effect on the dispatch interval for the next car to be dispatched. Thus, while the start of a car in a normal interval following its dispatch will reset the timer, a start an abnormally long interval after its dispatch will have no effect and the next car will receive a dispatch signal one dispatching interval following the preceding dispatch signal. This feature cooperates with the dispatch of a lightly loaded car in avoiding reset of the dispatch timer by departure of that car from the dispatch floor.

Another feature of the invention involves enhancing the rate at which cars are conditioned to return to the main dispatching floor as a function of the delays which the returning cars will encounter and the number of returning cars available to handle those delays. Thus, a car traveling from the main floor will be reversed at its farthest call when a given number of hall calls for the return direction are registered and no car is available to serve those calls. If that number of return hall calls is above a second threshold level, the car traveling away from the main floor will be reversed even though another down car is available. If the calls fail to reach that threshold the car will continue to an opposite terminal and be returned to the main floor in conventional manner. The returning cars can be time spaced in starting. This spacing can be altered with the requirements imposed on the system as by abbreviating the return dispatching intervals in response to the relationship of returning cars to hall calls for travel in the return direction. Individual intervals or a plurality of successive intervals can be abbreviated. In practice, a car might be reversed one-third of a normal dispatching interval for the opposite dispatching floor following the sensing of two hall calls in the return direction. If a greater number of hall calls were registered and a second car were also beyond its farthest call, that car would also be reversed one-third of a normal dispatching interval following the reversal of the preceding car. However, if lesser number of hall calls were registered, the second car would proceed toward the opposite dispatching floor and would either be reversed at some later interval if it has not reached that dispatching floor, and if it has reached that dispatching floor, it will be dispatched at the end of a full dispatching interval measured from the reversal of the preceding car. Similarly a third car might also be given an accelerated reversal if some greater number of hall calls were registered.

The abbreviation of the dispatch interval at the dispatching floor spaced from the main dispatching floor can be integrated advantageously with the dispatch timer reset functions for that floor by arranging a major portion of the acceleration of that interval to occur during its initial portion. Thus, a car at the second dispatching floor can start from that floor without resetting the dispatch interval of a following car when the interval following its dispatch has been accelerated since the initial period during which departure causes a reset will expire before it starts in response to its dispatch signal.

An additional feature enhancing car spacing involves the introduction into dispatching of a car which arrives at a dispatching floor from a floor beyond the dispatching floor. This feature is particularly applicable to a basement serving car returning upward to the lower dispatching floor. Advantageously, the car should not be interrupted in its travel if another car is available at the floor for dispatching. However, in that event, the travel of car from the floor in the dispatching direction should not reset the dispatch interval. If no car is loading at the dispatch floor the arriving car is conditioned for loading. If a car is in the load status throughout the stop of the car from the floor beyond that car should not be delayed at the dispatch floor beyond a reasonable interval such as the normal load transfer interval at floors intermediate the dispatching floors.

The above and additional objects and features of this invention will be appreciated more fully from the following detailed description when read with reference to the accompanying drawings in which:

FIG. I schematically represents a four-car group of elevators adapted for the incorporation of this invention and serving top and bottom floors and a multiplicity of intermediate floors under control of a group supervising system;

FIG. II is an across-the-line wiring diagram of car position sensing circuits typical of those individual to each car of the bank to which this invention applies;

FIG. III is an across-the-line wiring diagram of certain circuits in the up dispatching control for a bank of four cars to which this invention is applied and constitutes a portion of the supervisory control for the bank which is common to all the cars;

FIG. IV is an across-the-line diagram of the down dispatching circuits for the group of cars, together with the dispatch selecting circuits for those cars;

FIG. V is an across-the-line diagram typical of those individual to each car for establishing certain functions which are auxiliary to the dispatching operation;

FIG. VI is an across-the-line diagram of a number of circuits entering into the dispatching functions which are common to the cars of the bank;

FIG. VII is an across-the-like diagram of car accumulation counting, and hall call versus car travel monitoring circuits common to the cars of a bank; and FIG. VIII shows the top and bottom dispatch timers for the group supervisory control system.

Much of the material illustrated in the circuits described above has been shown heretofore in United States patent application Serial No. 808,290 which was filed March 30, 1959 for "Elevator Controls" and, therefore, will not be considered in detail. However, it is to be understood that certain aspects of this invention are applicable to a large number of known types of elevator dispatching and group supervisory controlled systems. With respect to those aspects of this invention, circuits employed herein are to be considered illustrative only and are not to be read as limiting either the spirit or scope of the invention.

FIG. I represents a bank of four cars, A, B, C and D. Throughout the specification and drawings, those elements individual to the cars have been identified therewith by the suffix letter designating the car enclosed in parenthesis. Thus, relay CUN(D) is the lower terminal selection relay for car D and contacts similarly designated are the contacts of that relay for that car. The illustrated system can be considered to constitute a bottom floor designated a basement B, a first floor above the basement which will be considered the lower dispatching terminal 1, a top floor T which will be considered the upper dispatching terminal and a plurality of intermediate floors 2, 3, 4, 5 and 6. It will be understood, of course, that the invention is applicable to a bank of elevators containing any number of cars and serving any number of floors. The elements individually associated with car A include a car 11 suspended by hoisting cables 12 trained over a traction sheave 13 driven by a lifting motor 14 which may be of any convenient type but ordinarily is arranged for variable voltage control as in the well-known Ward-Leonard type system. Coupled to the opposite end of the lifting cable 12 is a counterweight 15. A floor selector 16 is associated with the car to establish appropriate circuits for the car position at any instant. This floor selector can be of the commutating type, including a two-coordinate system of contacts on a panel where contacts for given functions are oriented in vertical lanes and the several contacts of the circuits performing different functions for each floor are generally aligned in rows transverse of those lanes. A crosshead (not shown) sustaining a number of commutating brushes is mounted to be carried along the contacts parallel to the lanes either in synchronism with the car or suitably in advance of the running car and in synchronism with the stopped car, depending on the nature of the selecting machine and controls. While the contacts of the floor selector illustrated in the circuits to be described are mechanically commutated by a crosshead which is advanced with respect to the car while the car is running, it is to be appreciated that controls employing other forms of mechanical commutators well known to the art can be adapted to this invention and that other forms of selector devices, such as relay type selectors also lend themselves to utilization of the features of this invention.

Each of the cars A through D have individual controls including the floor selectors 16(A) through 16(D) and supplemental equipment apart from those floor selectors. All of these car controls are integrated into a system insuring an interrelated operation of the cars by means of a group supervisory control schematically represented by the rectangle 17 interlinked to the floor selectors schematically by the cable 18. The group supervisory control 17 can include means for establishing various programs of operation in accordance with manual selecting devices, clock control devices or means sensing conditions in the elevator system. It also can include dispatch timers or devices which dispatch cars on other than a time basis for certain aspects of this invention and means for generally controlling the operating pattern of individual cars and the group even to the extent of removing cars from service or introducing cars into service.

The invention will be considered as applied to an automatic elevator system wherein no attendants are required on the cars and the passengers direct car operation by indicating their demands for service from hall call registering means 19 located at each of the several floors and including down hall call means at the top through the first floor and up hall call registering means at the basement through the floor adjacent the top floor or the sixth floor in the example. These call registering means can be common to all cars in the bank and are schematically represented as inter-connected to the several cars through the group supervisory control rectangle 17 by means of cabling 20. Passengers within the cars indicate their desired destinations by the registration of calls upon call registering means therein (not shown) which can be individual to the several floors served by the cars.

In the exemplary control system which this invention complements dispatch intervals and car operating patterns are altered as the integrated stop time of the elevator cars changes with respect to time. This form of dispatcher and program control is shown in the above noted application wherein certain other factors are given weight in effecting the changes. R. A. Burgy, United States patent application Serial No. 718,016, filed February 27, 1958 for "Elevator Controls Based on Number of Passenger Transfers," now abandoned, and refiled on August 3, 1959 as a continuation-in-part bearing the title "Elevator Controls Based on Passenger Transfers" and assigned Serial No. 831,432 (now Patent No. 3,065,823 issued November 27, 1962), incorporates the number of passenger transfers, passenger entries, or passenger exits at all or certain floors in a program and dispatcher control of this nature and can also be considered representative of another form of system to which this invention is applicable.

In order to facilitate an understanding of the circuits illustrated in FIGS. II through VIII, an alphabetical listing of the symbols for the relays and contacts utilized is presented below, together with a short description of those relays and the location, if shown, of their actuating coils. These relays and all other circuit elements are shown in across-the-line diagrams. The relay contacts therefore are often located remote from their actuating coils. In order to correlate the location of the actuating coils and contacts, a marginal key has been employed with each of the circuit diagrams. With this key, each diagram has been divided into horizontal bands which are identified with line numbers in the right hand margin. Relay symbols are located in the margin to the right of the line numerals and in horizontal alignment with the coil positions. The location of each contact actuated by a relay coil is set forth to the right of the relay symbol in the key by the numeral of the line upon which it appears. The numerals designating the location of back contacts, those which are normally closed when the relay is de-energized and are open when it is energized, are underlined in the key to distinguish them from front contacts, those which are closed upon their actuating coil being energized. Thus, the lower terminal selection relay actuating coil for car A, CUN(A), appearing on line 146, has a front contact at line 165, another front contact at line 196 and a back contact at line 192 as signified by the numerals in the margin of FIG. III at line 146. The relay and switch symbols illustrated are as follows:

| Symbol | Name | Line Location |
| --- | --- | --- |
| AMF | Car Above Main Floor Relay |  |
| BDR | Down Car Run Relay | 105 |
| BD2 | Down 2-Car Relay | 232 |
| BD3 | Down 3-Car Relay | 234 |
| BR | Basement Run Relay | 113 |
| BST | Basement Service Time Relay | 192 |
| BSTA | Auxiliary Basement Service Time Relay. | 191 |
| BUR | Up Car Run Relay | 108 |
| BU2 | Up 2-Car Relay | 236 |
| BU3 | Up 3-Car Relay | 240 |
| BU3A | Auxiliary Up 3-Car Relay | 205 |
| BU3B | do | 210 |
| CA(A) to (D) | Car Available Relay | 145–151 |
| CDD(A) to (D) | Down Dispatch Relay | 182–188 |
| CDL(A) to (D) | Down Load Relay | 177–180 |
| CUD(A) to (D) | Up Dispatch Relay | 122–131 |
| CUL(A) to (D) | Up Load Relay | 134–143 |
| CULA | Auxiliary Up Load Relay | 194 |
| CULB | do | 193 |
| CULC | do | 195 |
| CULX | Up Load Assignment Relay | 212 |
| CUN(A) to (D) | Lower Terminal Car Selection Relay. | 146–152 |
| CUNB | Auxiliary Lower Terminal Car Selection Relay. | 196 |
| DFD | Down Dispatch Timer Holding Relay. |  |
| DFDA | Auxiliary Down Dispatch Timer Holding Relay. |  |
| DFDL | Down Load Control Relay | 216 |
| DFDT | Down Load Control Timer | 218 |
| DFU | Up Dispatch Timer Holding Relay |  |
| DFUA | Auxiliary Up Dispatch Timer Holding Relay. |  |
| DFUL | Up Load Control Relay | 220 |
| DFUT | Up Load Control Timer | 224 |
| DF2 | Down Generator Field Relay |  |
| DL1 | Down Signal Direction Relay |  |
| DS0 to DS4 | Computed Interval Relays |  |
| FLD(A) to (D) | Full Load Dispatch Relays |  |
| GSA | Group Service Relay |  |
| HCR | High Call Return Relay |  |
| HP | Landing Signal Counting Relay | 243 |
| H2 | Off Peak Program Relay |  |
| JO | Up Dispatch Computer Failure Relay. | 273 |
| J1 to J3 | Up Dispatch Control Relays | 270–273 |
| KD | Down Scheduling Relay |  |
| KDT | Down Scheduling Timer | 204 |
| KU | Up Scheduling Relay |  |
| KO | Down Dispatch Computer Failure | 262 |
| K1 to K3 | Down Dispatch Control Relays | 260–262 |
| K4 | Down Dispatch Control Relay | 201 |
| LBP(A) to (D) | Load By-Pass Relay |  |

| Symbol | Name | Line Location |
| --- | --- | --- |
| MD | Moderate Down Traffic Relay |  |
| MDB | First Floor Down Dispatch Relay |  |
| MDX(A) to (D) | Do |  |
| MG | Bottom Dispatching Floor Relay | 110 |
| MGX | Auxiliary Bottom Dispatching Floor Relay. | 111 |
| MG1 | Top Dispatching Floor Relay | 103 |
| MG1X | Auxiliary Top Dispatching Floor Relay. | 102 |
| MU | Moderate Up Traffic Relay |  |
| RD | Down Dispatch Control Relay | 173 |
| RSD | Down Rotary Dispatch Selector | 169 |
| RSU | Up Rotary Dispatch Selector | 161 |
| RU | Up Dispatch Control Relay | 165 |
| SSA | Landing Call Indication Relay |  |
| S2D through STD | Landing Call Relays |  |
| UF2 | Up Generator Field Relay |  |
| XT | Load Car Sequence Relay | 222 |

It is to be appreciated that for many of the relay contacts which are duplicated for each of the several cars in the bank only a single typical actuating coil circuit is shown. In those cases, the actuating coils bear the relay designation with no parenthetical letter suffix and the actuating contacts are similarly devoid of a suffix since these circuits may be referred to with regard to operation of several cars. Most of the circuits of this nature occur in FIGS. II and V.

In relating the operation of several cars in a bank in order to provide well-distributed service by those cars, it is common to employ dispatching circuits which sequence the departure of the cars from the dispatching floors at which they are detained pending the issuance of appropriate starting signals. The principal features of the circuits of FIG. II or their equivalents are disclosed in my aforenoted pending applications. When a car is present at the upper dispatching floor, brush 21 engages contact segment 22 to energize top dispatching floor relays MG1 and MG1X at lines 102 and 103 respectively, provided the off peak program is in effect and contact H2 at 103 is closed, and the car is in group service operation so that contact GSA at 103 is closed. Normally closed push button contact 23 is actuated by an instant dispatch switch in the lobby control panel for the bank of elevators. As is more clearly appreciated from the aforenoted pending application, if relays MG1 and MG1X are de-energized, the car starting circuits will not require a dispatcher operation in order to restart the car after a stop at the top dispatching floor and, under those conditions, the car will restart upon the expiration of the normal standing time for any intermediate floor.

Down car run relay BDR at line 105 is actuated to indicate the initiation of operation of a car in the downward direction upon the displacement of brush 21 downward from the top dispatching floor to intercept segment 24 immediately below segment 22. The primary function of relay BDR is to reset the dispatch timer under normal circumstances and the hall call counting relay HP upon each departure of a car from the upper terminal or the high call reversal of that car. Up car run relay BUR at line 108 is actuated by brush 121 when it engages floor selector segment 25, upon the initiation of operation of the car away from the lower dispatch terminal in a manner corresponding to relay BDR, while relays MG and MGX for the bottom dispatching floor correspond to relays MG1 and MG1X in that they are energized while a car is standing at that bottom floor with its brush 21 in engagement with its contact segment 26. A car traveling to the basement has its basement run relay BR energized by the engagement of brush 27 with its floor selector contact 28 as the crosshead travels to the basement position. Relays BR, MG, MGX, MG1 and MG1X are individual to each of the cars in the elevator group. Only a single BUR and BDR is necessary for the group. Brushes 21(A) through 21(D) of the typical circuit shown in FIG. II are paralleled for each of the cars. These parallel connections are indicated by the arrowheaded lead 29 directed toward the right-hand side of the page. Thus, each of the MG1 relays is connected through its respective brush 21 to the common 23 contact at line 103 by means of the arrowheaded lead 29 and each set of floor selector contact segments 24 and 25 are connected through respective down and up generator field relay contacts DF2 and UF2, and for 25 a basement run relay contact BR, to the common portions of those relay circuits by means of arrowheaded leads 30 and 31.

The arrival of an elevator car at the lower dispatching terminal brings floor selector brush 21 into engagement with floor selector segment 26 and energizes bottom dispatching floor relay MG at line 110 from the alternating current supply across leads G and BB and energizes auxiliary bottom dispatching floor relay MGX through the up dispatch relay back contact CUD at line 111 for the arriving car. The energization of relay MGX, considered particularly with regard to car A, closes contact MGX(A) at line 146 to energize car available relay CA(A) at line 145 through the circuit traced from lead G, auxiliary basement service time relay contact BSTA(A), contact MGX(A) and back contacts BR(A) and CULA(A) at 146, coil CA(A) and lead BB. Car available relay CA initiates the selection of a car for operation away from the lower dispatching floor. The selection, in accordance with the aforenoted application, is for operation in either direction from that floor, assuming that there is a basement below and the plurality of floors above. Contact MGX at line 195 is also closed upon arrival of the car with no effect at this time. Contact MGX at line 235 closes in the up 2-car relay BU2 circuit with no effect.

Energization of relay CA(A) closes its contact at line 161 to partially complete a circuit for the up rotary dispatch selector RSU. Assuming no other car has its lower terminal car selection relay CUN energized, bottom dispatch control relay RU at line 165 is de-energized such that its back contacts at lines 161 and 162 are closed and rotary dispatch selector RSU is energized. This selector, accordingly, begins to hunt, successively closing a plurality of contacts corresponding in number to the number of cars available in the bank of elevators and arranged in the lower terminal selection relay circuits CUN for the several cars at lines 146, 148, 150 and 152. Assuming that contact RSU at 148 was closed at the time this sequence was initiated, in the absence of elevator car B from the lower terminal, no effect would be had and RSU would close the next succeeding contact at line 150. If car C were also absent from the lower terminal, it would advance to close contact RSU at line 152. If D were absent, a new cycle would be initiated by closing RSU at line 146. Since car A was assumed to be present at the lower terminal with its contact MGX(A) closed, lower terminal selection relay CUN(A) at line 146 would close its contacts at line 165 and energize bottom dispatch control relay RU opening back contacts RU at lines 161 and 162 to terminate the hunting operation of lower terminal rotary dispatch selector RSU. The RSU contact at line 146 is maintained closed by the stopped selector and CUN introduces car A into the dispatching sequence at the lower terminal.

When CUN(A) pulls in, in addition to closing its contacts in the bottom dispatch control relay circuits, it also renders car A initially available for basement service and, thereafter, in the absence of a basement service requirement, enables the car to become available for up load status. Basement availability exists during the drop out interval of basement service timer BST at line 192 upon the opening of back contacts CUN. The operation of BST and its auxiliary BSTA have been discussed in the aforenoted co-pending application. Leads 32 and 33, FIG. V, are supplied from a source of direct current. Normally timer BST is energized through back contacts CUN, CULB and MDB to close contact BST at line 191 and maintain BSTA energized. An interval after the selection of a car by its CUN relay, determined by the drop out time of BST, contact BST at line 191 opens to drop out relay BSTA. In the event that no demand for basement service existed during the drop out interval of BST, relay CUN remains energized through back contact MDX around the now opened contact BSTA(A) at line 146. Similarly, contact BSTA at line 193 opens the circuit shunting normally closed contact MDB, ordinarily with no effect, and back contact BSTA at line 196 closes to enable auxiliary lower terminal selector relay CUNB to pull in.

The energization of relay CUNB(A) for car A effects the assignment of that car to up load status provided no other car is in the up load status. It also enables through contact CUNB(A) at line 121 an up dispatch of the car if a call is in registration to drop out relay SSA and close its back contacts at 121 and if three cars are standing at the lower dispatching floor to close BU3A as will be described.

The circuit for CUL(A) is made from lead G through MDX(A) at 147, MGX(A) at 146, coil CUL(A), contact CUNB(A) at line 134, parallel contacts DFUT at lines 137 and 138 and parallel contacts XT at lines 141 and 142 to lead BB. When an up load relay is energized in the manner outlined, it seals itself in as by the closure of contact CUL(A) at line 133 for car A and energizes circuits preventing any other car from attaining the up load status by actuating auxiliary up load relays CULA, CULB and CULC at lines 194, 193 and 195, respectively, through closure of contact CUL at line 195. Load car sequence relay XT is pulled in through the closure of contacts CULA(A) at line 220. Relay XT closes its contact at 224 energizing relay DFUT. These relays open back contacts DFUT at lines 137 and 138 and XT at lines 141 and 142. As a result, the arrival of any other car at the lower terminal and the selection of that car enabled by the release of relay CUN(A) by virtue of opening of back contact CUL(A) at line 146 can be effected through a rotary dispatch selector operation as outlined for car A. The advance of the newly-arrived car through the CA, CUN, BST, BSTA and CUNB sequence to actuate the CUL relay is restrained such that its CUL relay cannot be energized while DFUT and XT are pulled in. Thus, one function of relays XT and DFUT is to indicate, while they are energized, that a car is in up load status and prevent the advance of another car to that status. The delayed drop out and sequencing functions of these relays will be considered below.

An up dispatch timer generally corresponding to that disclosed in detail in the aforenoted co-pending application is disclosed from lines 263 to 273 of FIG. VIII. In essence, it comprises a vacuum tube 34 and a voltage divider circuit 35 which can be adjusted to control the charging potential applied to a timing condenser 36 which by virtue of its charge determines the potential of control grid 37. Up dispatch timer relays J1, J2 and J3 are located in the cathode-anode circuit of tube 34 and are arranged so that they pull in at different currents corresponding to predetermined charge levels for condenser 36 and thus as a function of time with respect to certain operations of the elevator system. The condenser 36 is discharged upon the issuance of a dispatch signal at the completion of a timing cycle evidenced by the pull-in of relay J3 which in turn energizes relay KU by means not shown. Contact KU at line 273 is closed and back contact KU at line 263 is opened to assure this discharge and thereby reset the dispatch timer by completing a low resistance discharging circuit to condenser 36 and by disconnecting B+ from the voltage divider 35. The dispatch timer then beings to measure a new dispatch interval. A short time after the issuance of a dispatch signal a car normally departs from the lower terminal causing its brush 21 in FIG. II to engage its floor selector contact 25 at line 103 and energize relay BUR. BUR resets the dispatch timer in the same manner as KU by completing the condenser discharging circuit through its contact at line 273 and by disconnecting the charging voltage from voltage divider 35 through its back contact at line 263. Thus, normally car A would receive a dispatch signal a dispatch interval following the departure of the preceding car from the lower terminal since the dispatch timer, beginning from same reference point, would charge condenser 36 through the point energizing relays J1, then relay J2 and finally relay J3 to start the car. J3 by energizing relay KU closes contact KU at line 125, thereby energizing an up dispatch relay for the car then in load status, heretofore assumed as car A CUD(A) at line 122 through the closed front contact MG(A) and CULA(A) at 122. Relay CUD(A) in turn completes a car starting circuit (not shown) which initiates the closure of car doors and then initiates the starting of the car upward away from the lower terminal.

Upon pulling in, relay CUD(A) closes its contact at line 123 to make up a sealing circuit between leads G and BB through contact MG(A). It also drops out relay MGX(A) to drop out the up load relay CULA(A) upon opening of contact CUD at line 111. This enables any other car at the lower dispatching floor and thus available for advancement into "up load" status, as evidenced by its lower terminal selection through its CUN relay, to be advanced to the up load status through the sequence outlined for car A. When car A begins to leave the lower dispatching floor, floor selector brush 21 separates from contact 26 to drop out relay MG(A) and open its contact at line 122 so that CUD(A) is dropped out.

As noted above the dispatch timer resets twice, usually within a few seconds, the first resetting operation occurring as a result of a dispatch signal and the second occurring as the car begins to respond to that dispatch signal by departing from the dispatching floor. Occasionally, the door of a dispatch car is held to delay the starting of that car. In some instances the car may be delayed for a substantial portion of a dispatch interval. Under these circumstances, if the interval is reset when the car is released and permitted to start away from the dispatching floor, the effective dispatching interval for the following car will be the sum of the interval between the operation of relay KU and the starting of the car away from the dispatching floor plus a full dispatching interval. Thus, it is conceivable that the car might be delayed up to two full dispatching intervals in following the next preceding car away from the dispatching floor. Such delays are excessive. The dispatcher shown in FIG. III avoids these delays by preventing the reset of the dispatch timer by the departure of a car subsequent to a given point in the dispatch timing cycle. Thus, for example, if a car were delayed beyond the instant relay J1 was pulled in, arbitrarily at the end of one-half of a normal dispatch interval, and then were to depart, the dispatch timer will not cancel and measure a full cycle but rather will continue through to a normal timing interval and issue a starting cycle to the next car in the sequence. This is accomplished by preventing the operation of the BUR relay as the car departs from the dispatching terminal conveniently by means of a timer actuated by the issuance of a dispatch signal. When J1 of the up dispatch timer pulls in, it opens its back contact at line 108, thereby breaking the circuit to relay BUR from contact segment 25 for each of the cars inter-connected through the parallel lead 31. Thus, BUR cannot operate and the departure of the car has no effect on the dispatch timer or the interval measured by that timer. Under these conditions, the dispatch interval is measured from the issuance of the dispatch signal for the preceding car signified by the operation of the KU relay. However, for shorter delays it will be noted that the relay J1 is not yet energized and its back contact at line 108 is closed whereby resetting of the timer does occur when a car departs from the lower dispatching floor.

Operation of relay J1 is significant in the other functions for enhancing car distribution in a bank of elevators. This will become more apparent from the remainder of the description; however, it should be noted that the actuating conditions for the other functions alter the dispatch interval by abbreviating the initial portion of the dispatch interval to cause operation of J1 sooner and thus abbreviate the interval during which departure of a dispatched car from the dispatching floor will cause a reset to occur. This is accomplished by alteration of the voltage divider 35 so that the charging potential is raised to accelerate the charging of condenser 36 to the level pulling in relay J1.

A car loaded to a certain fraction of its capacity, often 80%, is caused to start away from a dispatching floor even though its dispatch interval has not expired. Such loading causes operation of a full load dispatch relay (not shown) to close contacts FLD of that relay at lines 269 and 270. In the present dispatch timer the dispatch interval is abbreviated by the loading of a car through these contacts since contact FLD at 270 increases the potential across condenser 36 by inserting resistance 38 in parallel with the permanently connected resistance of voltage divider 35 which is connected to the plate supply. Thus, the dispatch timer rapidly energizes relay J1 so that under conditions where a previously dispatched car departs at the time the full load relay of a following car in the sequence is operated the following car will not be retarded in traveling toward an opposite terminal by a reset of the dispatch timer since the travel of the preceding car from the dispatching floor would be ineffective to reset the dispatch timer.

The top terminal dispatch timer is shown in the upper portion of FIG. VIII between lines 251 and 263. It corresponds functionally to the bottom terminal dispatch timer described above. Down scheduling relay KD is energized upon the pull-in of down dispatch timer relay K3 and resets the timer by removing the potential from voltage divider circuit 45 at open back contact KD at line 251 and by shunting a low resistance discharge circuit across the condenser at line 262 through contact KD. In the same manner, the running of a car downward from the upper dispatching terminal indicated by the engagement of floor selector brush 21 with the contact segment 24 at line 106 while the car is set for down travel as indicated by closed down generator relay DF2 to pull in BDR resets the timer by opening back contact BDR at 251 and by closing front contact BDR at 262. Thus, departure of a car traveling downward from the upper dispatching terminal completes the circuit from BDR either through floor selector contact 24 or its equivalent from one of its other cars connected through arrow-headed lead 28 under normal circumstances. However, in the event of an abnormal delay, arbitrarily chosen for purposes of illustration as one-half a normal dispatching interval as indicated by the pull-in of time relay K1 at line 262, back contact K1 at line 106 is opened to render the departure of the cars ineffective in actuating BDR whereby the down dispatch interval expires the normal period following the operation of the down dispatching relay KD for the next preceding car.

The relays primarily involved in the down dispatching sequence include MG1, MG1X and BDR of FIG. II and most of those shown on FIG. IV. Arrival of a car at the top terminal engages brush 21 with floor selector contact segment 22 and energizes relays MG1 and MG1X at lines 102 and 103 through the common instant dispatch button 23 at line 103, and through the individual GSA and H2 contacts at line 103 and CDD back contact at line 102. The energization of MG1X, for purposes of description assumed to be for car A, closes contact MG1X(A) at line 169. Assuming that no other car is standing at the top dispatching terminal in the down load status so that no down load relay CDL is energized to close one of the CDL contacts at lines 173 to 176, down dispatch control relay RD is de-energized at line 173 and its back contacts at 169 and 170 are closed. Similarly, if no car has been released from the down load status for a given interval and no car is in that status so that the CDL contacts from lines 216 to 219 have been opened for that interval, down dispatch timer reset relay DFDT will be dropped out to close its back contacts at lines 169 and 170. Under these assumed conditions, the closure of contacts MG1X(A) completes a circuit for the down rotary dispatcher RSD at line 169 from lead G through contact MG1X(A), coil RSD, contacts RD and DFDT to lead BB. This causes a rotary dispatch selector to successively close its contacts RSD at lines 177 through 180 until it encounters that circuit including a closed top dispatching floor relay contact MG1X. In the assumed case, when contact RSD at line 177 is closed, this causes the energization of the down load relay for car A, CDL(A) through the circuit from lead G to contact MG1X(A), coil CDL(A) and contact RSD to lead BB. CDL(A) closes its contact at line 173 to energize down dispatch control relay RD opening its back contacts at lines 169 and 170, whereby rotary dispatch selector is stopped with its contact RSD at line 177 maintained closed. The down dispatch relay circuit for car A is partially completed by the closure of contact CDL(A) at line 182 so that that relay will be energized from lead G through MG1(A) at line 182, coil CDD(A) and contact CDL(A) upon the closure either of down scheduling relay contact KD at 184 or the closure of the down scheduling timer contact KDT and the down 3-car contact BD3, both at line 186. CDL(A) also closes a contact at line 216 to energize down dispatch timer reset relays DFDL and DFDT.

Relay DFDL closes its contact at line 232 to enable, on the off peak program when contact H2 at line 231 is closed, a circuit for the energization of down 2-car relay BD2 and down 3-car relay BD3. Assuming the presence of but one car at the top terminal and thus the closure of but one MG1X contact in the group from line 231 to line 234, closure of contact DFDL at 232 has no effect since insufficient current is drawn through a single resistor 51 to pull in either of these relays. However, if two cars are present at the uper terminal so that both have their MG1X relays energized, sufficient current flows through a parallel pair of resistors 51 to pull in BD2 and if three cars are present so that three MG1X contacts are closed, relay BD3 is pulled in.

In the aforenoted co-pending application Serial No. 808,290, relays for monitoring the up and down traffic in the system respectively identified as MU and MD are shown. Contacts for relays which are pulled in in response to similar or equivalent traffic conditions to those discussed in that application are illustrated at lines 202 and 203 herein. When either of these contacts are closed, it is indicative of a traffic condition in the system warranting an accelerated release of elevator cars from the top terminal when such cars tend to accumulate at that terminal. Thus, when two cars are present at the top terminal to energize relay BD2, its contact at line 202 is closed and in combination with either of closed contacts MU or MD, relay K4 is pulled in to abbreviate the dispatch interval. This abbreviation is effected by the closure of contacts K4 at line 257 and 259 to alter the voltage divider circuit 35 whereby the potential imposed at junction 48 is raised to accelerate the charging rate of condenser 46. Contact K4 at line 259 causes the initial portion of the top terminal dispatch interval to expire almost instantaneously, for example in about ¼ of a second. The pull in of relay K1 defines the end of the initial portion of the interval and opens back contact K1 so that closed contact K4 at 259 has no effect. Thereafter, the timer is accelerated to the K3 pull-in point by closed contact K4 at 257 which reduces the resistance between junction 48 and the plate supply so that the interval from the dispatch of a preceding car and the accumulation of two or more cars at the dispatching floor to the operation of relay K1 is reduced to a negligible period. In this manner, even the departure of a dispatched car will not reset the timer if the two additional cars accumulate between the dispatch instant and the start since K1 will render the resetting function of BDR ineffective. Further the interval between operation of K1 and the operation of K3 to dispatch the second car is abbreviated materially, for example to about ten seconds. When K3 operates it energizes down scheduling relay KD so that the down load car is dispatched pulling in its CDD to drop out its MG1X relay at 102 thereby dropping out its CDL relay at 177 through 180 to drop out DFDL at 216 to 219 and open contact DFDL at 236 so that relay BD2 is reset and can only be pulled in if two cars have their MG1X relays energized. The following dispatch cycle will therefore be normal unless another car arrives. Upon arrival of that car and pull in of BD2 the accelerated interval is again established and the starting reset operation rendered ineffective.

The presence of three undispatched cars at the top dispatching floor causes the dispatch of two in rapid succession in response to the next dispatch signal. Three cars energize relay BD3 which closes its front contact at line 204 to pull in down schedule timer KDT and opens back contact BD3 at line 186 so that the now closed contact KDT in series therewith has no effect. When a down dispatch signal is generated and contact KD at line 184 is closed, an abbreviated interval following the dispatch of the preceding car, if moderate traffic is present as described above, the car that had its CDL relay in during the interval is given a dispatch signal so that its CDD relay is energized and its CDL relay is dropped out. The rotary dispatch selector RSD immediately selects another down load car and pulls its CDL relay in. As the first car's CDL drops out to initiate this selection, relay DFDL at line 216 is momentarily deenergized to reset BD2 and BD3 by opening contact DFDL at line 232. This permits back contact BD3 to close at line 186. As the next selected car's CDL pulls in it completes a circuit for its down dispatch relay CDD from G through its MG1 contact, its CDD coil, its CDL contact all at lines 182, 184, 186 or 188, the closed KDT and BD3 contacts at line 186 and lead BB. The slow drop out characteristics of relay KDT hold contact KDT closed despite the open BD3 contact at line 204 for an interval sufficient to energize the second car's CDD relay but that interval is so chosen that it drops out before a third car can be selected.

The departure of two cars in rapid succession is desirably followed by a full dispatch interval if only one car remains at the terminal. Thus, the second car to leave the upper terminal is capable of operating relay BDR to reset the down dispatch timer unless two or more cars remain at that terminal. Reset is rendered effective since the release of load assignment of the second car by the drop out of its CDL relay drops out DFDL to reset relay BD2. If only one car remains BD2 is not reenergized when DFDL pulls in its contact at 232; hence K4 remains dropped out and K1 is not pulled in before that second car starts from the floor. With back contact K1 at 106 closed the timer is reset by BDR. If two cars are present BD2 is reenergized to pull in K4 and shortly thereafter K1 whereby the start of the second car does not reset the timer and it issues another dispatch signal in the two car accumulation interval, about ten seconds after the first dispatch signal in the example.

Acceleration of the top terminal dispatching interval through the operation of relay K4 will occur in response to another condition automatically sensed in the system. In particular, cars are rapidly dispatched when the number of hall calls for travel in the down direction reach predetermined levels and the number of down traveling cars capable of serving those calls are below given levels correlated with the several predetermined call levels. Relay HP in FIG. VII senses this state of the system.

Operation of down hall call counting relay HP injects a further accelerating factor in the down dispatch timer which causes that timer to time more rapidly than normal past the pull-in point of relay K1 and until relay K2 is pulled in leaving only the charging interval between the pull in of relay K2 and relay K3 for measurement by the timer. As in previous instances this renders the departure reset of the down dispatch timer ineffective almost as soon as the actuating condition prevails. This is effected by closure of contact HP in line 258 in conjunction with back contact K2 in that line, both of which place a shunting circuit around back contact K1. Thus, HP energizes K4 to close contact K4 at 259 so that the condenser 46 continues to charge past the point where relay K1 is energized and opens its back contact at line 259 and until relay K2 pulls in to open its back contact at line 258. The interval between the operation of K1 and K2 can be adjusted by a suitable choice of pull-in points for the relays and the value of resistor 49 so that it can range from practically zero to many seconds.

Initially consider only the call count functions of relay HP. If no cars are traveling downward so that none of down signal contacts DL1 from lines 224 to 249 are closed, all of the current passes through the hall call resistors 52 and flows through relay HP. The magnitude of resistors 52 can be suitably selected with respect to the pull-in level of HP. For example, HP might be arranged to pull in when two down hall calls are registered and no cars are traveling downward by choosing resistors 52 of a magnitude to pass the pull-in current when two are paralleled across leads 32 and 33. Assume a down hall call registered at the third and sixth floors to close contact S3D at line 247 and contact S6D at line 244. Under these circumstances, relay HP will pull in to close its contact at line 201 and energize relay K4 with the same results in the dispatching circuit as outlined above for the coincidence of closure BD2 and contact MU or contact MD. Upon the dispatch of a car, relay HP is reset by the opening of back contact KD at line 243. As the car departs downward from the upper terminal, it is again reset by the opening of back contact BDR. Issue of the dispatch signal at the top terminal to the car opens its back contacts CDD at line 102 to drop out its MG1X relay. Thereafter that relay is maintained dropped out inasmuch as the departure of a car from the floor separates brush 21 from floor selector segment 22. Closure of contact MG1X at line 244, 246, 248 or 249 completes a circuit for the car to place a car balance resistor 53 in shunt across relay HP so long as that car is set for down travel and has its DL1 contacts closed at 241 to 249 and is not loaded to an extent energizing its load by-pass relay LBP and opening its back contacts LBP in series with resistor 53. The shunting resistor 53 by-passes sufficient current around relay HP and so reduces the potential across the coil that it cannot pull in until a greater number of hall calls are registered. Assume that car A has been dispatched downward so the car balance resistor 53 at line 244 shunts coil HP and that two additional down hall calls are registered at the second and fourth floors to close contacts S2D at 248 and S4D at 246. The four down hall call resistors 52 in parallel now pass sufficient current from line 32 to pull in relay HP even with the shunting effect of a car balance resistor 53. Accordingly, with four down hall calls and one car conditioned to serve those calls the top dispatching interval is abbreviated materially and a second car is dispatched therefrom or, if no car is available, high call reversal circuits are partially established to reverse a car when it completes its service upward. The presence of additional down hall calls will again expedite the shift to down travel of a car despite the shunting of coil HP by additional car resistors 53. Thus, correlation is maintained between the number of down hall calls and the number of down traveling cars available to serve those calls such that the abbreviation of the interval cars are detained at the top terminal or are enabled to high call reverse is continued as long as the weighting of calls exceeds the down traveling cars in predetermined relationships.

The return to the main dispatching floor of cars which are or will be late for dispatching from the opposite or upper dispatching floor is also contemplated in the present arrangement. When a dispatch interval has expired or a given portion of that interval has expired, it is not uncommon to cause cars traveling toward that dispatching floor to reverse at or beyond their call farthest from the main dispatching floor. As shown in the aforenoted co-pending application the top dispatch timer is arranged to detent if no car is available at the upper dispatching floor for dispatching downward where the second dispatch interval relay K2 pulls in to close auxiliary down dispatch timer holding relay DFDA (not shown). This establishes a potential plateau at junction 48 sufficient to maintain condenser 46 charged at a level holding relay K2 in but insufficient to build up to a level pulling in relay K3. That application also shows contacts of DFDA which condition a highest call relay individual to each car for operation provided the car is traveling upward, has no car calls above it, and is at or above its highest hall call. The highest call relay thereby reverses a car which is otherwise available for reversal when the top dispatch timer detents. When a car reverses, it momentarily actuates a high call reversal relay HCR to close an HCR contact at line 105. This contact in cooperation with closed contact H2 of the off peak program relay energizes relay BDR to simulate the start of a car from the upper dispatching floor thereby resetting the top dispatch timer. Contact BDR at line 243 is also opened to reset relay HP. Reversal of the car operates its down signal direction relay to close its contact DL1 at line 244, 246, 248 or 249 by the time BDR drops out to again energize relay HP. Since the car has not reached the top dispatching floor, its MG1X contact at line 244, 246, 248 or 249 is closed and a circuit is completed to place its resistor 53 in shunt across relay HP thereby effectively changing the relationship of the number of down cars available to serve the down hall calls and requiring a greater number of such calls to again operate HP.

The avoidance of the reset of the dispatch timer when cars accumulate by the rapid operation of relay K1 following the dispatch of a car as described for operation at a top dispatching terminal is also applied at the lower dispatching floor. Relay BU2 measures the number of undispatched cars at the lower terminal in much the same manner that such cars at the upper terminal are measured by relay BD2. BU2 is conditioned for operation when a car has been conditioned for loading of up passengers at the lower terminal so that relay DFUL is energized and contact DFUL is closed at 236. DFUL pulls in as a car is conditioned for loading of up passengers by operation of CUL to pull in CULC and CULA whereby CULX at line 212 and DFUL at line 220 are energized. When two cars are present at the dispatching floor, each of their MGX relays are energized until they are issued dispatch signals and their relays CUD are energized to open back contact CUD at line 111. Thus two resistors 55 are paralleled in series with relay BU2 to pull in relay BU2.

BU2 is effective if moderate down traffic relay MD has closed its contacts at lines 269 and 270 in the manner outlined in the aforenoted co-pending applications in response to a measured requirement imposed as by stop time or passenger transfers. With the traffic level imposed and two undispatched cars at the lower floor the timer is accelerated to the J1 pull-in point through back contact J1 at 270 and contacts MD and BU2 at 269 such that that initial portion of the interval expires in about ½ second. Thereafter any car leaving the floor cannot reset the timer since J1 has opened the BUR actuating circuit. In the few seconds required to start a car after it receives a dispatch, two cars can accumulate at the lower dispatching floor to pull in J1, in this case the departure of that car will not delay the current load car by resetting the accelerated timer.

Completion of the lower terminal dispatching interval is also accelerated between operation of relays J1 and J3. Pull in of J1 reduces the potential on the grid side of condenser 36 by removing resistor 38 from its parallel relation to the normal resistance of voltage divider 35. However, contacts MD and BU2 remain closed until the current load car is dispatched, or sent away from the lower dispatching floor, or until the down traffic level falls to permit MD to drop out, and thereby shunt out a substantial portion of the resistance between B+ and the grid side of condenser 36 to increase its rate of charging.

BU2 is reset when the current load car is dispatched and loses its load status since DFUL drops out momentarily and during that instant BU2 drops out and the car shifted to dispatch status removes its resistor 55 from the circuit energizing relay BU2.

The concept of starting an unloaded car away from a dispatching terminal in order to enhance the spacing of those cars is applied to the lower terminal dispatcher. Relay BU3 is energized when three cars accumulated at the lower terminal. It can also be subject to coincidence of a predetermined condition such as a given level of stop time as required to close contact DSO at line 240. BU3 is fed from lead 32 through three parallel resistors 54 by virtue of the closure of three or more of the MG contacts of the individual cars at lines 239 to 242 at anytime when the traffic requirements imposed upon the system are at a threshold level or above, whereby interval relay DSO is closed at line 240 and the system is operating on the off peak program such that contact H2 at line 231 is closed. The presence of three cars at the lower dispatching terminal under these conditions enables that car having its lower terminal selection relay CUN pulled in to be dispatched provided a call for service is registered so that back contact SSA at line 121 is closed. A car in this state can be considered to be selected but not yet conditioned for loading. With three cars present in the lower terminal, at least one car must be in the up load status and have its CUL relay energized. This car is indicated to the waiting passengers as the next to leave by virtue of load lights or other known means. The two other cars at the lower dispatching terminal include a selected car having its CUN relay energized and an available car having its CA relay energized. Neither of these cars have been conditioned for loading; hence both are suitable for separation from the accumulation and rapid transfer to operation toward the opposite terminal without disturbing the normal entry of passengers in the car in up load status. However, since the cars are selected in their order of arrival and it is desirable to unload a car prior to its dispatch, it is advantageous to send the selected car from the floor and give the last car to arrive an opportunity to unload. It should be appreciated that the last car to arrive also could be sent from the floor according to this invention. The starting of an unloaded or at most only lightly loaded car enhances the car distribution since it is not delayed by car calls while the car being loaded is so delayed and therefore has its spacing increased from this leading car.

Upon arrival of the second car at the lower dispatching floor relay BU2 functions as above to accelerate the dispatch timer and render the car departure resetting circuit ineffective. The presence of a third car in energizing BU3 energizes the up dispatching relay CUD of the car having its lower terminal selection relay CUN energized through the circuit including back contact SSA of the call sensing relay and front contact BU3A of the auxiliary up 3-car relay at line 121 by means of closed contacts CUNB and MG(A). If car A were the car in this state, the circuit could be traced from lead G through contact MG(A), coil CUD(A) at line 122 and contacts CUNB(A), SSA, and BU3A at line 121. BU3A operates as follows: The sensing of three cars at the lower terminal in energizing relay BU3 closes contact BU3 at line 205 while a car has its lower terminal relays energized so that up dispatch relay RU closes its contact at line 205, thereby pulling in BU3A. BU3A seals itself in by closing its contact at line 206, closes the contact at line 121 to complete a dispatch circuit for the car which has been selected and not yet conditioned for loading or advanced to the load status and completes a circuit for relay BU3B by closing contacts BU3A at line 207. BU3B pulls in to close its contacs at line 209, thereby establishing a seal circuit for that relay to hold it energized when relay BU3A is dropped out by the opening of contact RU at 205. The issuance of a dispatch signal to the car having its CUN relay energized, evidenced by the pull in of its CUD relay, causes the de-energization of relay MGX to de-energize relay CUN. When contact CUN at lines 165 to 168 opens relay RU at 165 drops out contact RU at 205. Relay BU3B also opens a back contact at line 240 to reset up 3-car relay BU3. Thus, a second car cannot be dispatched directly from the operation of its lower terminal selection relay CUN until relay BU3B has been dropped out. BU3B prevents the dispatch of the third of the three cars present at the terminal as that car is introduced into lower terminal selection by the rotary dispatch selector. The expedited car releases relay BU3B by opening its seal circuit only when that car departs from the lower terminal and opens its MG contact at lies 122, 125, 128 or 131 to de-energize its up dispatch relay CUD. It should be noted that the opening of contact BU3A at line 121 has no effect in the drop out of relay BU3B. The relay seals itself in through one of the CUD contacts at lines 208, 209, 210 or 211. When the car does depart from the floor, its CUD contact at lines 208, 209, 210 or 211 opens, dropping out BU3B and, thereby conditioning the up 3-car relay energizing circuit for subsequent operation upon the accumulation of three cars at the terminal.

Since the operation of up 2-car relay BU2 will ordinarily precede operation of BU3, J1 is energized at that time and the departure of that car from the lower terminal has no effect upon the dispatch timer. That timer completes its cycle in due course issuing a dispatch signal to the car in the up load status. In the event traffic has not reached the level necessary to operate relay MD and close its contacts at lines 269 and 270, relay J1 will not be energized until the first portion of the dispatch interval has expired in due course. This is desirable since a car should be available at the lower dispatching floor if it can be held there without diminishing service elsewhere. The reset by the expedited car can as a maximum extend the dispatch interval of the load car to one and one-half times a normal interval.

In keeping with this theory that service from the main or lower dispatching floor is of paramount importance, cars which return to that floor from the basement are introduced into the dispatching sequence under certain conditions. When a car runs to the basement, it energizes its basement run relay BR by carrying brush 27 into contact with segment 28 at 113. BR is sealed in at line 112 until the car is assigned a load status to open back contact CULB at line 112 or travels above the main floor to open back contact AMF at line 112. Thus the car must travel to the main floor with its BR relay energized so that back contacts BR at 146, 148, 150 or 152 are open to prevent operation of its lower terminal car selection relay, and so that contacts BR at lines 135, 138, 141 or 144 are closed. If another car remains in the up load status with its CUL relay energized while the basement run car is at the lower terminal, after the usual standing time, such as at other floors, the basement run car restarts upward and operates relay AMF to open back contact AMF at line 112 and drop out relay BR. If no car is at the main floor at the time the basement run car arrives, it is introduced directly into the dispatching sequence. Its open back contact BR in the circuits of its CUN and CA relays bar operation of the usual selection sequence, and the closing of its BR contacts in the circuit of its BUL relay in cooperation with its MGX relay pulls relay CUL in to assign the car to up load status. After CUL has established its seal circuit, the BR relay is dropped out by opening back contact CULB at line 112 as a result of closure of contact CUL at line 195 and operation of relay CULB at line 193. This breaks the seal by contact BR at line 112. The circuit for car A, for example, which effects this assignment is from lead G through contacts BSTA(A) and MGX(A) at line 146, coil CUL(A) at line 134, contact BR(A) at line 135, contacts XT at lines 141 and 142 to lead BB. When the dispatch signal is issued to the load car the dispatch timer is reset and upon departure of the car prior to the operation of relay J1 relay BUR is energized through the now closed BR back contact at line 108 to effect a second reset of the timer.

Presence of a basement run car at the lower dispatching floor while an up load car is dispatched causes that basement run car to be assigned as the up load car. This maintains a correct time spacing between departures from the lower terminal. Assume that car B was the up load car dispatched while car A, the basement run car, was at the lower dispatching floor. As car B receives its dispatch signal through closure of contact KU at line 125 its relay CUD(B) is energized to de-energize relay MGX(B) at line 111 and drop out its CUL(B) at line 137 and CULC(B) at line 195. When CUL(B) drops out, it drops out CULA at line 194 and CULB at line 193. Momentarily, no car has its CULC or CULA contacts closed at lines 212 to 215 and 220 to 223. Relay DFUL at 220 drops out immediately, timer XT drops out a given interval after the CULA contact opens. That interval is adjusted to enable the up scheduling relays KU to reset, opening contact KU at line 125, after car B has sealed its dispatch relay CUD(B) through contact CUD(B) at 126 whereby the next up load car will not receive the dispatch signal for the preceding dispatched car. When XT drops out it opens its contact at line 224 to initiate the drop out interval of relay DFUT and closes its back contacts at line 141 and 142 so that the energizing circuits for the up load relays through the BR contacts at lines 135, 138, 141 and 144 are partially completed. Since car A is assumed to be present as a basement run car its contact BR(A) at 135 is closed and a circuit for relay CUL(A) from lead G, through contacts BSTA(A), MGX(A), coil CUL(A) and contacts BR(A) and XT to lead BB is complete thereby establishing car A as the up load car. CUL(A) is sealed in at contact CUL(A) line 133.

A selected car is barred from load assignment under these circumstances since back contacts DFUT at 137 and 138 were prevented from closing initially by the delayed drop out of relay DFUT and thereafter by the assignment of another load car to close its auxiliary up load relay contacts CULC(A) at line 212 and CULA(A) at line 220 whereby relays CULX at 212, DFUL at 220, XT at 222 and DFUT at 224 were all energized.

When a basement run car is at the lower dispatching floor, it functions as any other car in the up two-car and up three-car relay circuits. Thus, if it is present while a car is in the up load status the dispatch interval is accelerated while it is present. If it was one of three cars present, the selected car, that having its CUN relay energized, would be dispatched immediately if a call was registered or upon the registration of a call. Reset of the dispatch timer is subject to the conditions outlined in that if the interval for operation of J1 has expired, and it is quite probable that it will due to the timer acceleration by BU2, the dispatch of the load car by the timer and KU will reset the timer but departure without timer dispatch as by the selected car in response to BU3 will not cause a reset.

In recapitulation of this invention, it improves the distribution of elevator cars operating in a group or bank to retard or expedite the operation of the cars as dictated by their distribution. It is particularly adapted to a system serving a plurality of floors and having at least one dispatching floor from which cars are released at timed intervals. It has been applied to the dispatch timer and elevator system of copending United States patent applications Serial No. 808,290 filed March 30, 1959 and entitled "Elevator Controls" and Serial No. 718,016 filed February 27, 1958 entitled "Elevator Controls Based on Number of Passenger Transfers." One preferred form comprises a dispatch timer actuating at the termination of measured intervals, means issuing a dispatching signal to a car wherein the time is reset upon the issuance of the signal and second means to reset the timer upon the response of the car to that signal or by the departure of a car from the dispatching floor in the dispatching direction. When a car is tardy in responding to the dispatching signal or a car departs from the dispatching floor in the dispatching direction a given interval following the dispatch signal or reset of the dispatch timer, a means rendering the second timer resetting means ineffective is actuated so that the next car to be dispatched is started a given interval following the first dispatch signal rather than an interval following the response of the next preceding car to that signal. A number of features supplement this concept in the preferred embodiment although many might be applied to elevator systems not embodying the concept. They include: reducing the dispatching interval, reversing a car at or beyond its farthest call, and starting an unloaded car while another car is loading. These functions are triggered by accumulation of cars at a dispatching floor both from floors spaced therefrom in the dispatching direction and floors spaced therefrom in the opposite direction, the relationship of levels of demand for service to the number of cars conditioned to satisfy those demands, and other traffic conditions taking into consideration factors such as the stop time of cars at floors while conveying passengers as a function of time, the number of passenger transfers as a function of time, the traffic level in a given direction, the number or frequency of call registrations, car loading and the like.

A car which is at the lower dispatching floor following service to the basement, generically termed a floor beyond serving car since it might function similarly at a top dispatching floor following service to an attic, is introduced into the dispatching sequence as a load status car if a vacancy in that status occurs during its stop at the dispatching floor. Thus, a floor-beyond-run car is conditioned for loading in preference to a car selected in the usual manner and while in the absence of such conditioning its departure from the dispatching floor is ineffective on the second or car departure reset means for the dispatch time, once it is conditioned for loading the second reset means is responsive to its departure. The presence of a floor-beyond-run car is counted in sensing the number of cars accumulated at a dispatching floor for implementing other concepts of this invention.

The number of cars present at a dispatching floor increases the speed with which intervals measured by the dispatch timer expire. A given accumulation will accelerate the interval to the point where the second dispatch timer reset means is rendered ineffective and accelerate the remainder of the interval at one or more different rates.

Distribution of cars is enhanced by sending a car away from a dispatching floor before it is conditioned for loading so that it contains no load and therefore has no car calls to retard its travel. A car conditioned for loading can be started in due course without regard to the departure from the dispatching floor of that car unconditioned for loading since the second reset means of the dispatch timer can be rendered non-responsive to the departure of the unconditioned car. This type of distribution is considered drastic and has been illustrated as being established by accumulation of a large number of cars such as three out of a bank of four at a dispatching floor.

The number of calls registered, particularly hall calls for a given direction of travel, is compared with the number of cars conditioned to serve those calls, especially cars traveling in the call direction or conditioned to travel in that direction, and in response to a given relationship of calls to cars the dispatch timer adapted to release cars for immediate service of those calls is accelerated. As in regard to the other aspects of car distribution the second reset means for the timer is rapidly rendered ineffective in response to these conditions whereby the departure of a car from the dispatching floor, as in response to a previously issued timed dispatch or other reasons such as an excessive accumulation, will have no effect on the dispatch interval and cars will be released therefrom expeditiously.

It is to be appreciated that the elements of the combinations disclosed above can be combined in various ways and with elements other than those illustrated without losing their efficacy as means for improving car distribution. Thus, the release from a dispatching floor of a car which has not been conditioned for loading can be combined with other types of dispatchers and can be triggered by other conditions in the system. Similarly, lockout of the reset of a timer or dispatcher normally reset by a departure of a car from a dispatching floor can be utilized in other dispatchers and actuated by other conditions. Accordingly, this disclosure is to be read as illustrative of the inventive aspects and not as limiting their spirit or scope.

I claim:

1. In an elevator system comprising a plurality of cars serving a plurality of floors including a dispatching floor, means for stopping cars when they travel to said dispatching floor, means to condition cars for loading while at said dispatching floor, means to start conditioned cars in a given direction from said dispatching floor, means to sense a predetermined condition in said system including the presence of a car stopped at the dispatching floor which has been conditioned for loading and the presence of a car stopped at the dispatching floor which has not been conditioned for loading, and means responsive to said predetermined condition for starting in said given direction a car stopped at the dispatching floor which has not been conditioned for loading.

2. In an elevator system comprising a plurality of cars serving a plurality of floors including a dispatching floor, means to detain cars which stop at said dispatching floor, means to condition cars stopped at said dispatching floor to receive a load for traveling in a given direction, means to start conditioned cars from said dispatching floor, means for sensing the presence of a given number of cars in a given region of travel in said system, for sensing the presence at the dispatching floor of a car which has been conditioned for loading, and for sensing the presence at the dispatching floor of a car which has not been conditioned for loading, and means for starting a car which has not been conditioned for loading from the dispatching floor in response to said sensing means.

3. In an elevator system comprising a plurality of cars serving a plurality of floors including a dispatching floor, means to detain cars which stop at said dispatching floor, means to individually select cars at said dispatching floor for travel therefrom, means to condition a selected car to receive a load for travel in a given direction, means to start a conditioned car in response to a predetermined condition, means for sensing the presence of a given number of cars in a given region of travel in said system and the presence at the dispatching floor of a car which has not been conditioned for loading, and means for starting a car which has not been conditioned for loading from the dispatching floor in response to said sensing means.

4. In an elevator system comprising a plurality of cars serving a plurality of floors including a dispatching floor, means for stopping cars when they travel to said dispatching floor, means to condition cars for loading while at said dispatching floor, means to start conditioned cars in a given direction from said dispatching floor, means to sense the presence of more than two cars stopped at the dispatching floor, and means responsive to the presence of more than two cars at the dispatching floor for starting an unconditioned car away from said floor.

5. In an elevator system comprising a plurality of cars serving a plurality of floors including a dispatching floor, means for stopping cars when they travel to said dispatching floor, means to condition cars for loading while at said dispatching floor, means to start conditioned cars in a given direction from said dispatching floor, means for counting the number of cars at the dispatching floor, and means responsive to the presence of a predetermined number of cars for starting an unconditioned car away from said floor.

6. In an elevator system comprising a plurality of cars serving a plurality of floors including a dispatching floor, means for stopping cars when they travel to said dispatching floor, means to condition cars for loading while at said dispatching floor, means to start conditioned cars in a given direction from said dispatching floor, means for sensing a given level of utilization of said system, means for sensing service requirements common to a plurality of said cars, means for sensing the presence at the dispatching floor of a car which has not been conditioned for loading, and means responsive to a coincidence of at least the presence of a conditioned car at said dispatching floor, the presence of an unconditioned car at said dispatching floor, and the imposition on said system of a given level of service requirements common to a plurality of said cars for starting said unconditioned car from said dispatching floor in said given direction.

7. In an elevator system comprising a plurality of cars serving a plurality of floors including a dispatching floor, means for stopping cars when they travel to said dispatching floor, means to select cars for travel from said dispatching floor, means to condition a selected car for loading while at said dispatching floor, means to start conditioned cars in a given direction from said dispatching floor, means for sensing service requirements common to a plurality of said cars, means to sense a predetermined condition in said system including the presence of a car stopped at the dispatching floor which has been conditioned for loading, the presence of a car stopped at the dispatching floor which has not been conditioned for loading and the imposition of a given level of service requirements common to a plurality of said cars, and means responsive to said predetermined condition for starting in said given direction that car which is selected as next to be conditioned for loading.

8. In an elevator system comprising a plurality of cars serving a plurality of floors including a dispatching floor, means for stopping cars when they travel to said dispatching floor, means to condition said stopped cars to receive a load to be transported in a given direction, means to start a conditioned car in said given direction, means for sensing the service requirements common to a plurality of said cars, means to sense a predetermined condition in said system including the presence of a car stopped at the dispatching floor which has been conditioned, the presence of a car stopped at the dispatching floor which has not been conditioned and the imposition of a given level of service requirements common to a plurality of said cars, means responsive to said predetermined condition for starting in said given direction from said dispatching floor said car which has not been conditioned and means for preventing the starting from said dispatching floor in said given direction another car which has not been conditioned.

9. A combination according to claim 8 including means to disable said preventing means upon the issuance of a dispatch signal to a conditioned car.

10. In an elevator system comprising a plurality of cars serving a plurality of floors including a dispatching floor, means for stopping cars in response to demands for service, means for automatically restarting cars after a response to a service demand, means for stopping the cars at the dispatching floor, means for detaining cars at the dispatching floor, means for selecting cars individually to be sent away from said dispatching floor, means to condition selected cars for receiving a load for travel in a given direction from said dispatching floor, means for issuing dispatch signals to conditioned cars on a time interval basis, means for starting a car from said dispatching floor in response to a dispatch signal, means for measuring the level at which the system is being utilized, means for counting the number of cars at the dispatching floor, means responsive to a predetermined level of utilization and a coincident predetermined count of cars including at least one selected and unconditioned car at the dispatching terminal for issuing a start signal to said selected and unconditioned car, means sensing the response of said selected and unconditioned car to said start signal, means for reflecting said response in said counting means, and means for preventing issuance of a start signal to a second selected and unconditioned car until the first selected and unconditioned car has responded to said start signal.

11. In an elevator system comprising a plurality of cars serving a plurality of floors including a dispatching floor, means for stopping cars when they travel to said dispatching floor, means to condition cars for loading while at said dispatching floor, means for generating a dispatching signal, means to start conditioned cars in a given direction from said dispatching floor in response to a dispatching signal, means to sense a predetermined condition in said system including the presence of a car stopped at the dispatching floor which has not been conditioned for loading, means responsive to said predetermined condition to enable a car stopped at the dispatching floor which has not been conditioned for loading for starting in said given direction, and means responsive to a dispatch signal for starting said enabled car.

12. A system in according with claim 11 wherein said predetermined condition comprises a plurality of elevator cars stopped at a dispatching floor.

13. In a passenger operated elevator system comprising a plurality of cars serving a plurality of floors including a dispatching floor; means for registering landing calls at floors served by the cars; means for automatically stopping cars when they travel to said dispatching floor from a given direction; means to condition cars for loading while at said dispatching floor; means to start automatically a conditioned car in said given direction from said dispatching floor provided a call is in registration which said conditioned car can serve; and means to sense predetermined conditions in said system including the presence of a car stopped at the dispatching floor which has not been conditioned for loading and the registration of a landing call which said unconditioned car can serve for automatically starting said unconditioned car in said given direction.

14. In a passenger operated elevator system comprising a plurality of cars serving a plurality of floors including a dispatching floor; means for registering landing calls at floors served by the cars; means for automatically stopping cars when they travel to said dispatching floor from a given direction; means to condition cars for loading while at said dispatching floor; means to start automatically a conditioned car in said given direction from said dispatching floor provided a call is in registration which said conditioned car can serve; and means to start automatically in said given direction a car at said dispatching floor which has not been conditioned independently of said means for starting said conditioned car in said given direction in response to the registration of a landing call which said unconditioned car can serve.

15. In a passenger operated elevator system comprising a plurality of cars serving a plurality of floors including a dispatching floor; means for registering landing calls at floors served by the cars; means for automatically stopping cars when they travel to said dispatching floor; means to condition cars for loading while at said dispatching floor; means to start automatically a conditioned car in a given direction from said dispatching floor provided a call is in registration which said conditioned car can serve; and means to sense predetermined conditions in said system including the presence of a car stopped at the dispatching floor which has not been conditioned for loading and the registration of a landing call which said unconditioned car can serve for automatically starting said unconditioned car in said given direction.

16. In a passenger operated elevator system comprising a plurality of cars serving a plurality of floors including a dispatching floor; means for registering landing calls at floors served by the cars; means for automatically stopping cars when they travel to said dispatching floor; means to condition cars for loading while at said dispatching floor; means to start automatically a conditioned car in a given direction from said dispatching floor provided a call is in registration which said conditioned car can serve; means for sensing the presence of a given number of cars in a given region of travel in said system, the presence at the dispatching floor of a car which has not been conditioned for loading, and the registration of a landing call to which said unconditioned car can respond; and means for starting said unconditioned car in said given direction in response to coincident state of said sensed conditions.

17. In a passenger operated elevator system comprising a plurality of cars serving a plurality of floors including a dispatching floor; means for registering landing calls at floors served by the cars; means for automatically stopping cars when they travel to said dispatching floor; means to condition cars for loading while at said dispatching floor; means to start automatically a conditioned car in a given direction from said dispatching floor provided a call is in registration which said conditioned car can serve; means for counting the number of cars at the dispatching floor; and means responsive to the presence of a predetermined number of cars at said dispatching floor and the registration of a landing call to which an unconditioned car can respond for starting an unconditioned car away from said floor in said given direction.

18. In a passenger operated elevator system comprising a plurality of cars serving a plurality of floors including a dispatching floor; means for registering landing calls at floors served by the cars; means for automatically stopping cars when they travel to said dispatching floor; means to condition cars for loading while at said dispatching floor; means to start automatically a conditioned car in a given direction from said dispatching floor provided a call is in registration which said conditioned car can serve, means for counting the number of cars at the dispatching floor; and means responsive to the presence of a predetermined number of cars at said dispatching floor and the registration of a landing call to which an unconditioned car can respond for starting away from said floor in said given direction that unconditioned car of a plurality of unconditioned cars at said dispatching floor which was first to arrive at said dispatching floor.

19. In a passenger operated elevator system comprising a plurality of cars serving a plurality of floors including a dispatching floor; means for registering landing calls at floors served by the cars; means for automatically stopping cars when they travel to said dispatching floor; means to select cars for travel from said dispatching floor; means to condition a selected car for loading while at said dispatching floor; means to start automatically a conditioned car in a given direction from said dispatching floor provided a call is in registration which said conditioned car can serve; means for starting from said dispatching floor in said given direction an unconditioned car which is selected as next to be conditioned for loading in response to a landing call which said unconditioned car can serve.

20. In a passenger operated elevator system comprising a plurality of cars serving a plurality of floor including a dispatching floor; means for registering landing calls at floors served by the cars; means for automatically stopping cars when they travel to said dispatching floor; means to condition cars for loading while at said dispatching floor; means to start automatically a conditioned car in a given direction from said dispatching floor in response to a given condition in said system; and means to sense predetermined conditions in said system including the presence of a car stopped at the dispatching floor which has not been conditioned for loading and the registration of a landing call which said unconditioned car can serve for automatically starting said unconditioned car in said given direction.

References Cited in the file of this patent

UNITED STATES PATENTS

| | | |
|---|---|---|
| 2,652,903 | Borden et al. | Sept. 22, 1953 |
| 2,696,896 | Suozzo | Dec. 14, 1954 |